United States Patent
Thomson

(10) Patent No.: US 9,741,054 B2
(45) Date of Patent: *Aug. 22, 2017

(54) REMOTELY CACHEABLE VARIABLE WEB CONTENT

(75) Inventor: Brian W. Thomson, Unionville (CA)

(73) Assignee: International Business Machines Corporation, Armonk, NY (US)

( * ) Notice: Subject to any disclaimer, the term of this patent is extended or adjusted under 35 U.S.C. 154(b) by 355 days.

This patent is subject to a terminal disclaimer.

(21) Appl. No.: 13/542,899

(22) Filed: Jul. 6, 2012

(65) Prior Publication Data

US 2014/0012937 A1    Jan. 9, 2014

(51) Int. Cl.
  *G06F 15/167* (2006.01)
  *G06Q 30/02* (2012.01)
  *G06F 17/30* (2006.01)

(52) U.S. Cl.
  CPC ... *G06Q 30/0269* (2013.01); *G06F 17/30902* (2013.01)

(58) Field of Classification Search
  CPC .................................................. G06Q 30/0255
  USPC ................ 709/203, 229, 217, 224; 715/745; 719/320
  See application file for complete search history.

(56) References Cited

U.S. PATENT DOCUMENTS

| | | | |
|---|---|---|---|
| 6,757,661 B1 * | 6/2004 | Blaser .................... | G06Q 30/02 705/14.54 |
| 7,949,564 B1 * | 5/2011 | Hughes et al. ............ | 705/14.49 |
| 8,296,451 B2 * | 10/2012 | Lowery et al. ............... | 709/229 |
| 8,805,950 B1 * | 8/2014 | Landsman et al. ........... | 709/213 |
| 2002/0138555 A1 * | 9/2002 | Yu ...................... | G06F 17/30902 709/203 |
| 2003/0125977 A1 | 7/2003 | Morioka et al. | |
| 2006/0122883 A1 * | 6/2006 | Lynn .................... | G06Q 30/02 705/14.46 |
| 2007/0112959 A1 * | 5/2007 | Bean ............................ | 709/224 |
| 2008/0059631 A1 * | 3/2008 | Bergstrom et al. .......... | 709/224 |
| 2008/0288583 A1 | 11/2008 | Agarwalla et al. | |
| 2009/0112829 A1 * | 4/2009 | Bremer et al. .................... | 707/4 |
| 2009/0228904 A1 * | 9/2009 | Meijer et al. ................. | 719/320 |
| 2010/0095220 A1 * | 4/2010 | Kassab ........................ | 715/745 |

(Continued)

OTHER PUBLICATIONS

Ravi, Jayashree, et al., "A Survey on Dynamic Web Content Generation and Delivery Techniques," Journal of Network and Computer Applications, vol. 32, Issue 5, Sep. 2009.

(Continued)

*Primary Examiner* — Wing F Chan
*Assistant Examiner* — Andrew Woo
(74) *Attorney, Agent, or Firm* — Nelson and Nelson; Daniel P. Nelson; Alexis V. Nelson

(57) ABSTRACT

A method for caching targeted webpage content is disclosed. In one embodiment, such a method includes dividing a cacheable content pertaining to a website into a static portion and a dynamic frame for displaying visitor targeted content. The method determines a result for one or more targeting rules applied to a visitor's activity on a portion of the website and provides the result to the visitor's browser. The method further includes loading the dynamic frame of the cacheable content with visitor targeted content based on the provided result. A corresponding apparatus and computer program product are also disclosed.

12 Claims, 9 Drawing Sheets

(56) References Cited

U.S. PATENT DOCUMENTS

| | | | | |
|---|---|---|---|---|
| 2010/0100445 A1* | 4/2010 | Flood | ............... | G06Q 30/02 |
| | | | | 705/14.64 |
| 2010/0114720 A1* | 5/2010 | Jones | ............ | G06Q 30/0251 |
| | | | | 705/14.73 |
| 2011/0225368 A1 | 9/2011 | Burge, III | | |
| 2011/0295683 A1* | 12/2011 | Mak | ............... | 705/14.49 |
| 2012/0089700 A1* | 4/2012 | Safruti et al. | ........... | 709/217 |
| 2012/0303697 A1* | 11/2012 | Alstad | ............... | 709/203 |

OTHER PUBLICATIONS

"Caching in on the Enterprise Grid—Turbo-Charge Your Applications with OracleAS Web Cache," An Oracle Technical White Paper, Sep. 2005, available at oracle.com.

"EMC Documentation Web Experience Management Solution by FatWire," last accessed Apr. 30, 2012 at http://www.emc.com/collateral/software/solution-overview/h4803-dctm-wem-fatwire-so.pdf.

Akamai, "Web 2.0 is Here—Is Your Web Infrastructure Ready?," 2006, available at http://www.tentonmarketing.com/Portfolio/Akamai_Web_2.0_Whitepaper.pdf.

\* cited by examiner

REMOTELY CACHEABLE VARIABLE WEB CONTENT

BACKGROUND

Field of the Invention

This invention relates to apparatus and methods for remotely caching web pages with variable content.

Background of the Invention

To accelerate website content delivery, to reduce network traffic, and to offload the demands placed on a particular server, technologies are often employed that cache portions of a website within a Content Delivery Network ("CDN"). Such technologies are most effective where the content is cached remotely on servers at the edges of a CDN closest to the client, or clients, accessing the website. Where the content of webpages is relatively static, changing little over time, that content can easily be cached remotely with little concern. This is not the case, however, for dynamic content, which changes frequently and must be regenerated often, and variable, or personalized, content which is dynamic by virtue of being selected according to a personalization rule from a collection of variants, each variant being relatively static.

Webpages that are able to support e-commerce rely on variable content for advertisements, transactions, and other functions essential to the mission of such websites. Such variable content is often tailored/targeted to those visiting the corresponding website. For these reasons, a merchant's website will often contain variable content central to an e-commerce experience, where shoppers spend the bulk of their time when they are actively shopping. This variable content is often supplemented by more static content that provides information about the merchant's activities and products. Such static content can include corporate information, product descriptions, and product manuals. It is not uncommon for these static portions to make up a much larger volume of information than the variable content.

The cacheability of an entire page is determined by the least cacheable content that was assembled to produce the page. Therefore, a page assembled entirely from static content, selected by impersonal rules, is a static page and can be cached and reused for all viewers of the website. However, if the page contains any variable content, or if the selection of content uses personalized rules, the resulting page is variable and cannot be cached and shared among viewers as a whole.

Not only would it be desirable and relatively easy to store such static content remotely for the reasons set forth above, but it would also reduce the need to use more resource intensive means of storing the static content, such as the creation of IBM WEBSPHERE COMMERCE pages, or pages in some other software platform framework for e-commerce, to contain the content of those pages. At the same time, it is desirable to retain the functionality of variable content for certain frames, or portions, within those static pages because of the traffic they receive from potential customers. For example, it is desirable to use certain frames, or portions, of these static pages for targeted marketing content that is coordinated with other online campaign activities. It can also be desirable to tailor content to a particular visitor or segment of visitors to the webpage.

Current approaches for caching web pages with variable content are inadequate to meet these needs. One approach, referred to as Edge Side Include ("ESI"), divides a page into cacheable portions, such as the header and the footer of a page, and un-cacheable portions, such as a frame containing weather updates. Drawbacks of this approach, however, are that the variable content cannot be stored remotely to reduce latency and network traffic, and the generation of variable content cannot be offloaded to other servers. Also, ESI technology is proprietary and can be a cost prohibitive solution.

In view of the foregoing, what are needed are apparatus and methods to more efficiently remotely cache static web pages that contain frames with dynamic and targeted content.

SUMMARY

The invention has been developed in response to the present state of the art and, in particular, in response to the problems and needs in the art that have not yet been fully solved by currently available apparatus and methods. Accordingly, the invention has been developed to more efficiently remotely cache otherwise static webpages that contain variable content. The features and advantages of the invention will become more fully apparent from the following description and appended claims, or can be learned by practice of the invention as set forth hereinafter.

Consistent with the foregoing, a method for caching the content of fully generated static and variable portions of web pages is disclosed herein. Throughout this application, the term "portion," or "portions," can comprise a number of noncontiguous areas of a webpage. In one embodiment, such a method includes dividing webpage content pertaining to a website into a static portion and a variable portion. The variable portion can be configured to display variable content configured to be visitor targeted, including, in some embodiments, several pieces of visitor targeted content.

The method also can include pre-evaluating information about a visitor to the website according one or more targeting rules to produce one or more result values. The method can further include provisioning the result values to a browser of the visitor for storage. The one or more result values can comprise at least a portion of a cache key. The cache key can be correlated to visitor targeted content such that the browser can access the visitor targeted content cached remotely on a cache server. In some embodiments, one or more asynchronous calls to the remote cache server can embed a portion of the visitor targeted content in the variable portion of the website.

In further embodiments, the method can also include generating a generic uniform resource locator. The generic uniform resource locator can represent a collection of variant content. The collection of variant content can include visitor targeted content. In certain embodiments, visitor targeted content can expire after a predetermined amount of time. Additionally, such embodiments can include generating a targeted uniform resource locator for a particular unit of visitor targeted content pertaining to the collection of variant content. The targeted uniform resource locator can include the generic uniform resource locator and a result value. Such embodiments can also include rendering a standalone page configured to display at least a portion of the variable portion of the website using the cache key. In such embodiments, the cache key can include the generic uniform resource locator and the result value. The standalone page can then be provisioned to the browser.

In some embodiments, a header for a particular visitor targeted content can then be included to indicate that the particular visitor targeted content with the header is cacheable. In certain embodiments, the particular visitor targeted content can have been previously cached remotely on the } cache server. An indication can also be given that the particular visitor targeted content can be accessed from the cache server for loading into the variable portion of the website. Additionally, the cache key of the browser can also include information unrelated to a result value from the targeting rules and can be updated by one or more update result values upon a subsequent visit to the website by the browser.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
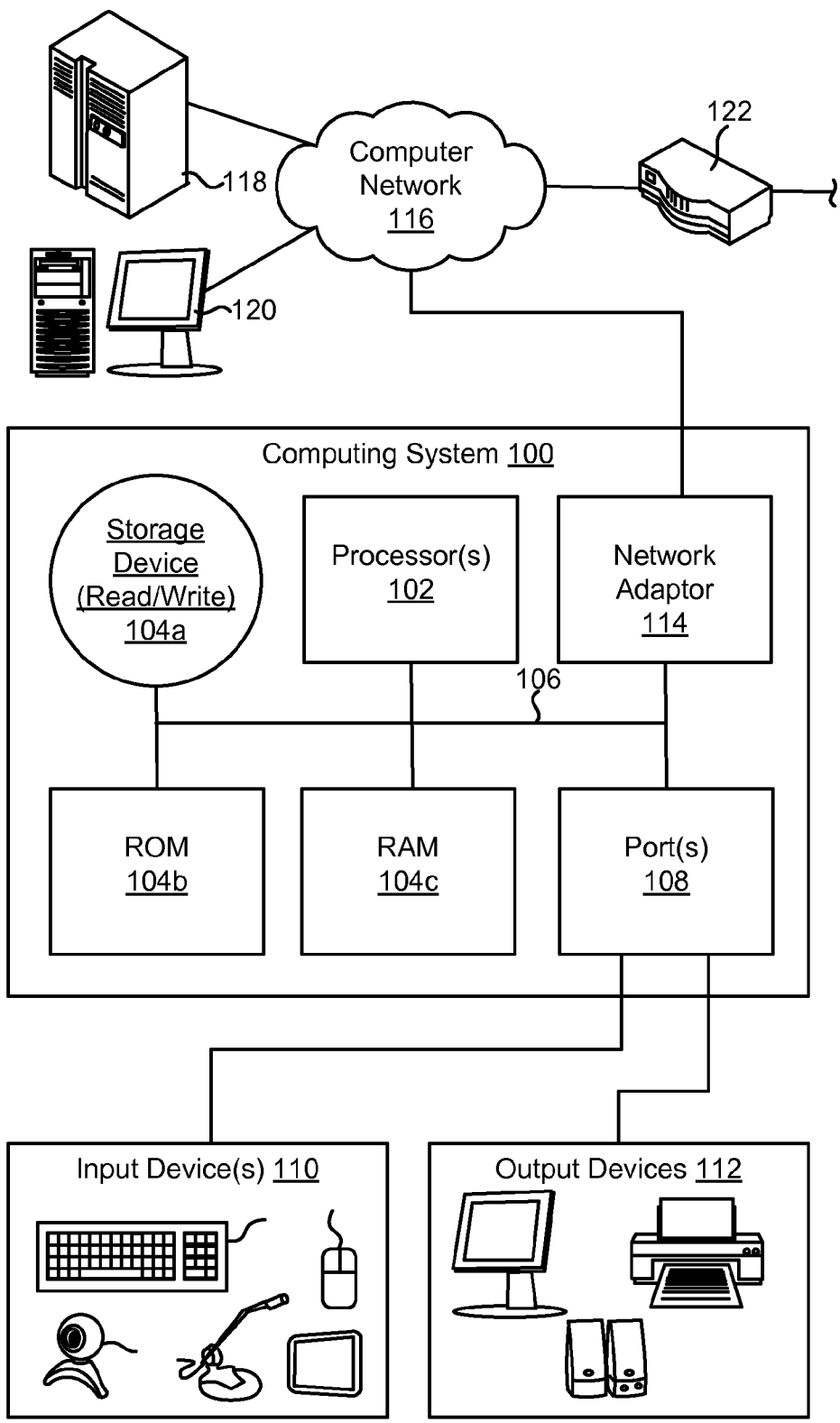
FIG. 1 is a high-level block diagram showing one example of a computing system in which an apparatus and method in accordance with the invention can be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention can be embodied as an apparatus, system, method, or computer program product. Furthermore, the present invention can take the form of a hardware embodiment, a software embodiment (including firmware, resident software, microcode, etc.) configured to operate hardware, or an embodiment combining software and hardware aspects that can all generally be referred to herein as a "module" or "system." Furthermore, the present invention can take the form of a computer-usable storage medium embodied in any tangible medium of expression having computer-usable program code stored therein.

Any combination of one or more computer-usable or computer-readable storage medium(s) can be utilized to store the computer program product. The computer-usable or computer-readable storage medium can be, for example but not limited to, an electronic, magnetic, optical, electromagnetic, infrared, or semiconductor system, apparatus, or device. More specific examples (a non-exhaustive list) of the computer-readable storage medium can include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. In the context of this document, a computer-usable or computer-readable storage medium can be any medium that can contain, store, or transport the program for use by or in connection with the instruction execution system, apparatus, or device.

Computer program code for carrying out operations of the present invention can be written in any combination of one or more programming languages, including an object-oriented programming language such as Java™, Smalltalk, C++, or the like, conventional procedural programming languages such as the "C" programming language, scripting languages such as JavaScript, or similar programming languages. Computer program code for implementing the invention can also be written in a low-level programming language such as assembly language.

Embodiments of the invention can be described below with reference to flowchart illustrations and/or block diagrams of methods, apparatus, systems, and computer program products. It will be understood that each block of the flowchart illustrations and/or block diagrams, and combinations of blocks in the flowchart illustrations and/or block diagrams, can be implemented by computer program instructions or code. These computer program instructions can be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions can also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, one example of a computing system 100 is illustrated. The computing system 100 is presented to show one example of an environment where an apparatus and method in accordance with the invention can be implemented. The computing system 100 is presented only by way of example and is not intended to be limiting. Indeed, the apparatus and methods disclosed herein can be applicable to a wide variety of different computing systems in addition to the computing system 100 shown. The apparatus and methods disclosed herein can also potentially be distributed across multiple computing systems 100.

As shown, the computing system 100 includes at least one processor 102 and can include more than one processor 102. The processor 102 can be operably connected to a memory 104. The memory 104 can include one or more non-volatile storage devices such as hard drives 104a, solid state drives 104a, CD-ROM drives 104a, DVD-ROM drives 104a, tape drives 104a, or the like. The memory 104 can also include non-volatile memory such as a read-only memory 104b (e.g., ROM, EPROM, EEPROM, and/or Flash ROM) or volatile memory such as a random access memory 104c (RAM or operational memory). A bus 106, or plurality of buses 106, can interconnect the processor 102, memory devices 104, and other devices to enable data and/or instructions to pass there between.

To enable communication with external systems or devices, the computing system 100 can include one or more ports 108. Such ports 108 can be embodied as wired ports 108 (e.g., USB ports, serial ports, Firewire ports, SCSI ports, parallel ports, etc.) or wireless ports 108 (e.g., Bluetooth, IrDA, etc.). The ports 108 can enable communication with one or more input devices 110 (e.g., keyboards, mice, touchscreens, cameras, microphones, scanners, storage devices, etc.) and output devices 112 (e.g., displays, monitors, speakers, printers, storage devices, etc.). The ports 108 can also enable communication with other computing systems 100.

In certain embodiments, the computing system 100 includes a network adapter 114 to connect the computing system 100 to a network 116, such as a LAN, WAN, or the Internet. Such a network 116 can enable the computing system 100 to connect to one or more servers 118, workstations 120, personal computers 120, mobile computing devices, or other devices. The network 116 can also enable the computing system 100 to connect to another network by way of a router 122 or other device 122. Such a router 122 can allow the computing system 100 to communicate with servers, workstations, personal computers, or other devices located on different networks.

Figure 2:
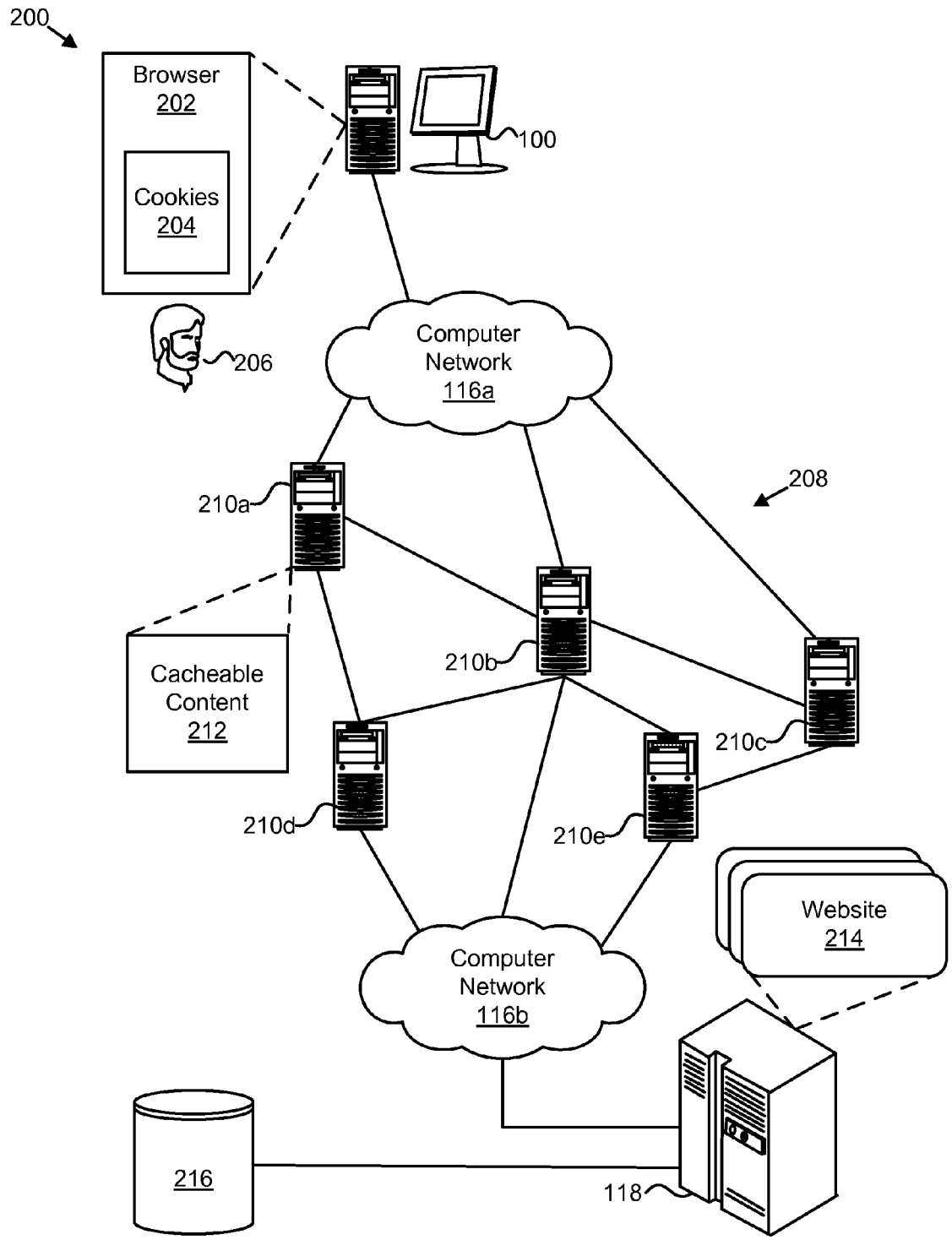
FIG. 2 is a high-level block diagram showing one example of a computing network in which an apparatus and method in accordance with the invention can be implemented.

Referring to FIG. 2, one example of a computing network 200 providing an environment where an apparatus and method in accordance with the invention can be implemented is illustrated. The network 200 can include a computing system 100 similar to that discussed with respect to FIG. 1. The computing system 100 contains a browser 202 capable of storing a set of browser cookies 204 that provide information about the activities of a user 206 on the computing network 200. The computing network 200 can include one or more sub networks 116a, 116b similar to the network 116 described in relation to FIG. 1. These sub networks 116a, 116b can be coupled to one or more networks of cache servers 208.

A network of cache servers 208 can include several individual cache severs 210a-e capable of caching materials for a webpage. Among these individual cache severs is an individual cache server 210a, or edge server 210a, on an edge nearest to a computing system 100 of a user 206. The edge server 210a, deployed in a location nearest to the geographic region of the computing system 100 of the user 206, includes a cacheable content 212 with content from a website 214 that the user 206 intends to visit and can serve visitors from a particular region from geographically disperse potential users of the website 214. In an alternative embodiment, the edge server 210a can be an archival or content management system.

Depending on the embodiment, the website 214 is served from the same web domain. The website 214 can be maintained on a website server 118, similar to the one depicted in FIG. 1, which, in certain embodiments, is coupled to a backend unit 216 comprising various applications and/or technologies for accessing data, such as, without limitation, one or more databases with one or more different supporting data structures, a storage area network, and/or one or more database management systems. The website server 118 and/or the backend unit 216 can comprise a datacenter serving a large geographic region.

Figure 3:
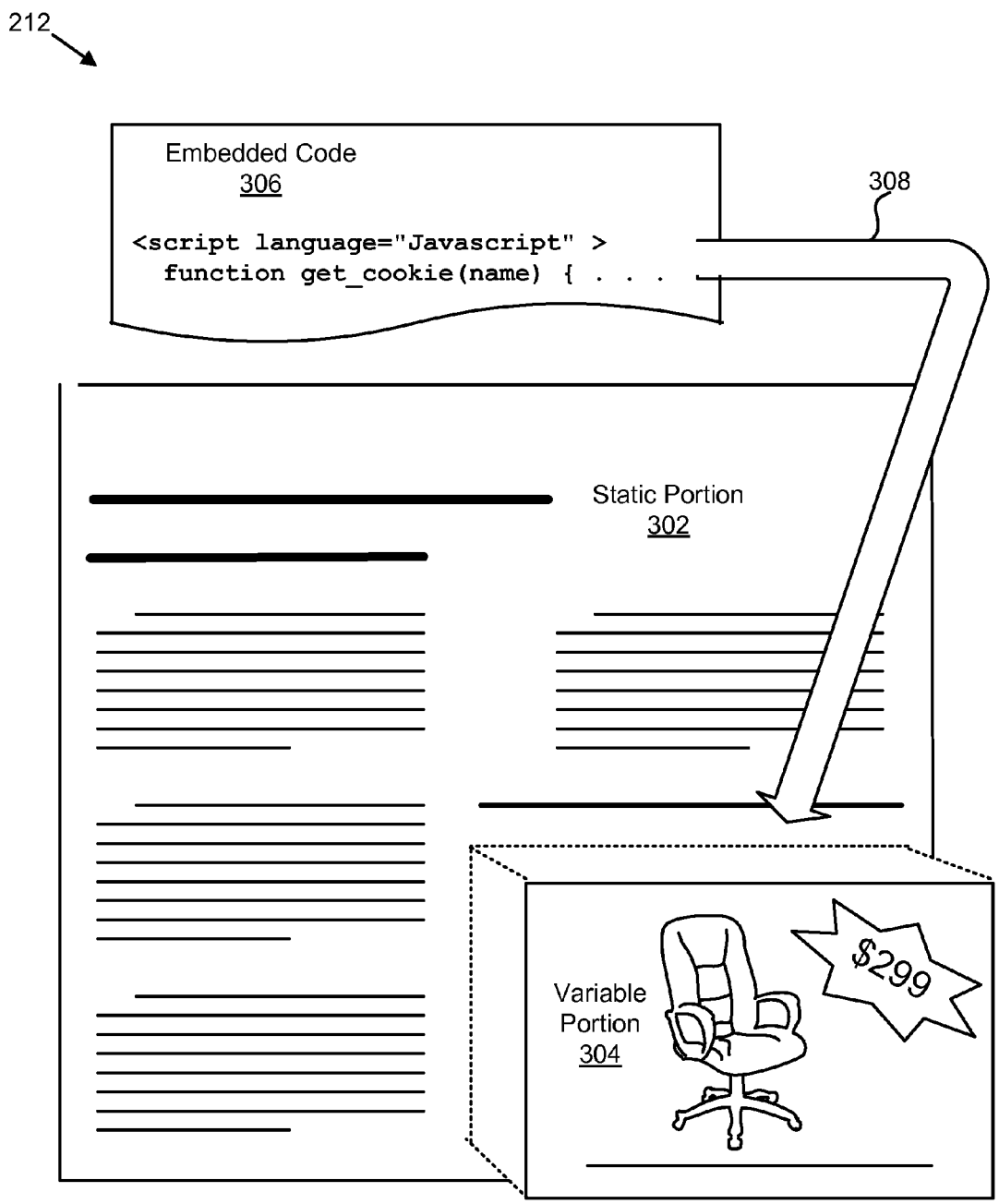
FIG. 3 shows one example of a cacheable web page with static content and a portion reserved for variable content.

Referring to FIG. 3, cacheable content 212, similar to that depicted in FIG. 2, can include a static portion 302, and a variable frame 304, depicted in FIG. 3 as they might appear as displayed by a browser 202, similar to the one depicted in FIG. 2. The variable portion 304 can be separated from the static portion 302 and supplied by a separate HTTP request. The static portion 302 of the cacheable content 212 includes relatively static content, which can include, for example and without limitation, in the context of an e-commerce website 214, corporate information, product descriptions, and product manuals. Depending on the embodiment, the static portion 302 can contain various other types of data and other content that changes little over time and can be cached according to various existing and known technologies.

The variable content, which can include e-spot data, in the variable portion 304, however, can be subject to more frequent changes, ranging from seasonal changes in marketing campaigns to stock quotes that are updated much more frequently. In certain embodiments, the variable portion 304 can be reserved for content targeted for a particular user/visitor 206 visiting the cacheable content 212 in accordance with aspects of the invention discussed below. Depending on the embodiment, the variable portion 304 can comprise one or more frames of a frameset in a document or an inline frame, or iframe, in the body of a document. The variable portion 304 can also be any other element, such as an image element, mapping to a segment of a visual HTML browser window that is split into segments. Other possibilities exist for distinct regions of a website that correspond to the variable portion 304.

The static portion 302 and the variable portion 304 can include, without limitation, rendered information in the form of text, hyperlinks, and static images (including, without limitation, TIFF, GIF, JPEG, PNG files and vector formats such as SVG or FLASH). They can include audio (such as MPG files), video (such as WMV, RM, FLV, MPG, and MOV files), and animated images (including, without limitation, applets and animated image files). Furthermore, they can include (especially the variable portion 304) interactive content such as forms, DHTML interactive text, buttons, interactive illustrations and other interactive media facilitated by script orchestration, for example, by FLASH, JAVA APPLETS, SVG, and SHOCKWAVE.

The static portion 302 and variable portion 304 can also include internal information, not normally displayed by a browser 202, including, without limitation, metadata, comments, visual specifications, such as Cascading Style Sheets (CSS), and linked files. As alluded to above, the static portion 302 and the variable portion 304 can include scripts, such as JAVASCRIPT, to facilitate functionality and interactivity.

The cacheable content 212 depicted in FIG. 3 includes an element of such internal information in the form of embedded code 306. In FIG. 3, the embedded code 306 is depicted as JAVASCRIPT consistent with one embodiment of the invention, but many other forms of code will be apparent to those of ordinary skill in the art. The embedded code 306 uses information obtained from the browser 202 of the visitor 206 accessing the cacheable content 212, such as cookies 204, to perform functions consistent with the present invention. Cookies, however, are not the only example of such information carried by the browser. For example, and without limitation, with mobile devices and HTML 5, other transmission and storage options substantially equivalent to the use of cookies, and recognizable to those of ordinary skill in the art, can be employed in additional embodiments.

In some embodiments, the embedded code 306 uses information from the browser 202 to select a particular standalone page targeted to the visitor 206 for display in the variable portion 304. The embedded code 202 can make a separate HTTP request to access the visitor targeted content, either from the website server 118, the edge server 210a on which the visitor targeted content can be cached, or any other cache server 210b-e where the visitor targeted content can be cached. The embedded code 306 can also make determinations, consistent with the present invention, about whether to cache the visitor targeted content on the edge server 210a, as discussed further below. Potentially, the embedded code 306 can also make determinations about caching the visitor targeted content on some other server 210b-e.

In as much as a variable portion 304, such as an iframe, can have undesirable scrolling or clipping behavior if the frame dimensions are smaller than the content dimensions, the embedded code 306 can address these issues by resizing the frame to a natural size. This resizing can be accomplished by the embedded code 306 without problems from browser cross-domain scripting protection in embodiments where the content for both the static portion 302 and the variable portion 304 are served from the same domain.

Certain embodiments configured to accommodate certain browsers 202, such as certain versions of INTERNET EXPLORER™ that will not calculate scrolling dimensions if the frame size in the variable portion 304 is truly zero, include an encoded function within the embedded code 306 to assign initial frame dimensions of at least one pixel, instead of zero. In certain embodiments, the embedded code 306 can include encoded functions that size the frame in the variable portion 304 based on contextual considerations, such as those found in style sheets. It is also possible to use an alternate approach where the body from the iframe document is copied into the main document by such a function.

Figure 4:
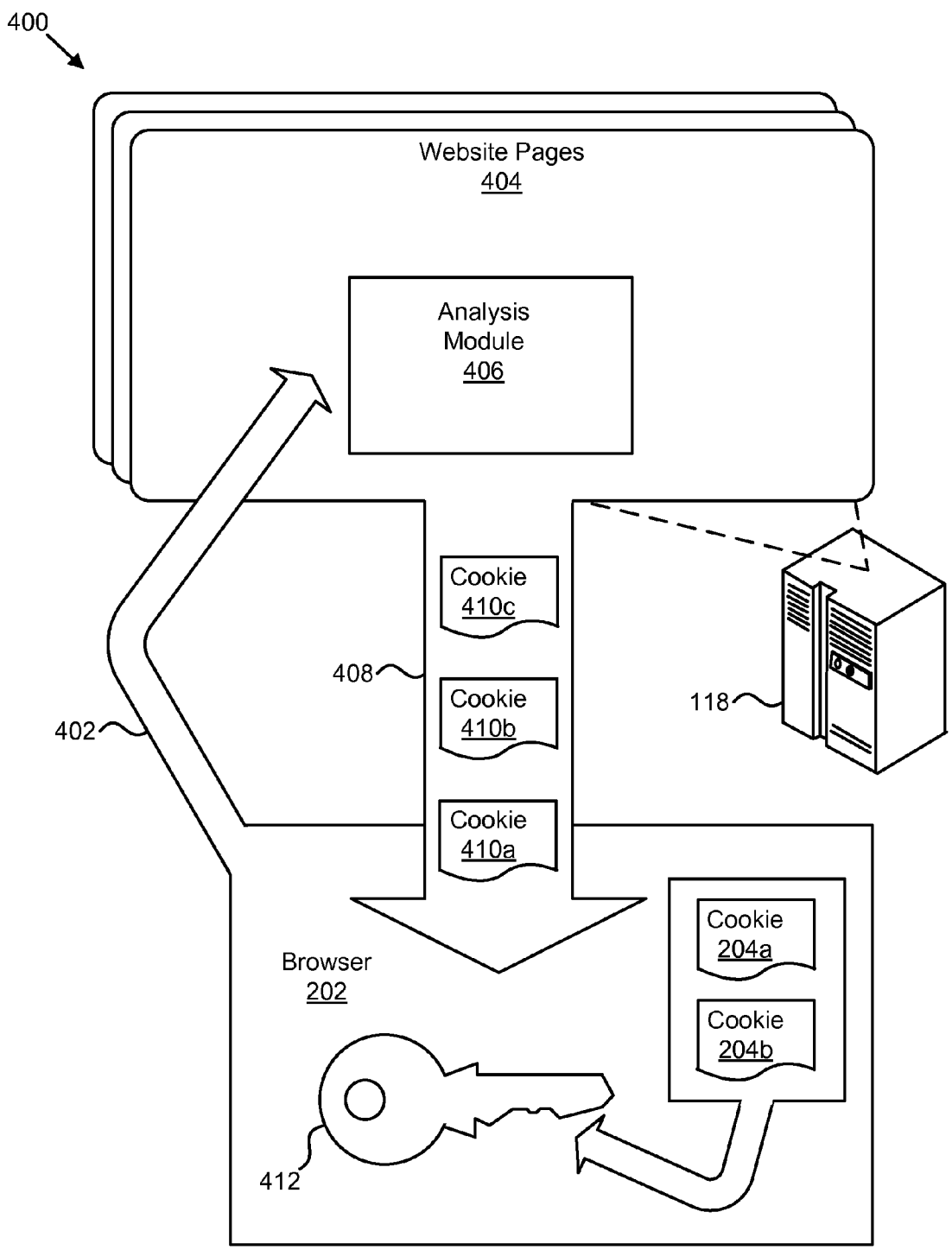
FIG. 4 shows one example of a portion of a website providing cookies and/or other information that make up a cache key to a browser visiting the website.

Referring to FIG. 4, provisioning 400 of information to a browser 202 of a visitor 206 of a website 214 is depicted. The browser 202 associated with the visitor 206 accesses 402 a set of pages 404 of the website 214 residing on a website server 118. In certain embodiments, the set of pages 404 can also resides on one or more cache servers 210a-e. Within the set of pages 404 an analysis module 406 is embedded.

The analysis module 406 analyzes the activities of the visitor 206 on the set of pages 404 in accordance with one or more targeting rules to produce one or more result values that the analysis module provisions 408 to the browser 202. In some embodiments, the one or more result values are provisioned 408 to the browser 202 in one or more cookies 410a-c. However, the provisioning 408 of the one or more result values are not limited to cookies, with other approaches, such as those discussed above being possible. All references to cookies throughout this application include all other known technologies with a similar function of storing information on a browser 202. In certain embodiments, the analysis module 406 also analyzes preexisting cookies 204a-b, or other information, provided to the analysis module 406 by the browser 202. The activity information of the visitor 206 on the set pages 404 can include information about particular webpages accessed, the time spent on one or more webpages, files accessed, e-commerce transactions, and queries and responses, among other potential information about a user's 206 actions relative to the set of pages 404.

The cookies 204a-b, or other pre-existing information, that can already reside with the browser 202 can contain information about previous visits to the set of pages 404 or from other activities of the user 206 in relation to the broader internet. The preexisting cookies 204a-b can also include, among other types of cookies, a persistent commerce personalization cookie capable of providing information about the visitor 206 even if the visitor 206 has not authenticated it in a current session and even if the user 206 has not registered on the website 214. Both the provisioned cookies 410a-c and the preexisting cookies 204a-b can also include information about, without limitation, the user's 206 explicit segment membership, profile and demographics information, purchase history, and shopping cart contents, with respect to the set of pages 404, the website 214 in general, or other websites.

Depending on the embodiment, one or more provisioned cookies and/or other provisioned information 410a-c and/or the previously-existing information and/or cookies 204a-b can make up at least a portion of a cache key 412 maintained by the browser 202. The cache key 412 can include all manner of information about the visitor's 206 activities on the set of pages 404 and/or the website 214, as filtered through the targeting rules of the analysis module 406. The targeting rules can also filter information about the visitor's 206 activities on the internet generally, and, potentially, about the visitor 206 as such. The targeting rules of the analysis module 406 embed the cache key 412 with the information necessary to access visitor targeted content for display in the variable portion 304 of the cacheable content 212 of the website 214. The targeting rules can be predetermined, in certain embodiments, by a marketing engine or pre-existing business logic. The cache key 412 can also include a store ID associated with the website 214, and, for example, a catalog ID associated with products displayed on the website 214 in which the visitor's activities have indicated an interest. Ancillary information, such as a visitor 206 identity ("ID"), need not be impediments to the operation of the cache key 412.

Figure 5:
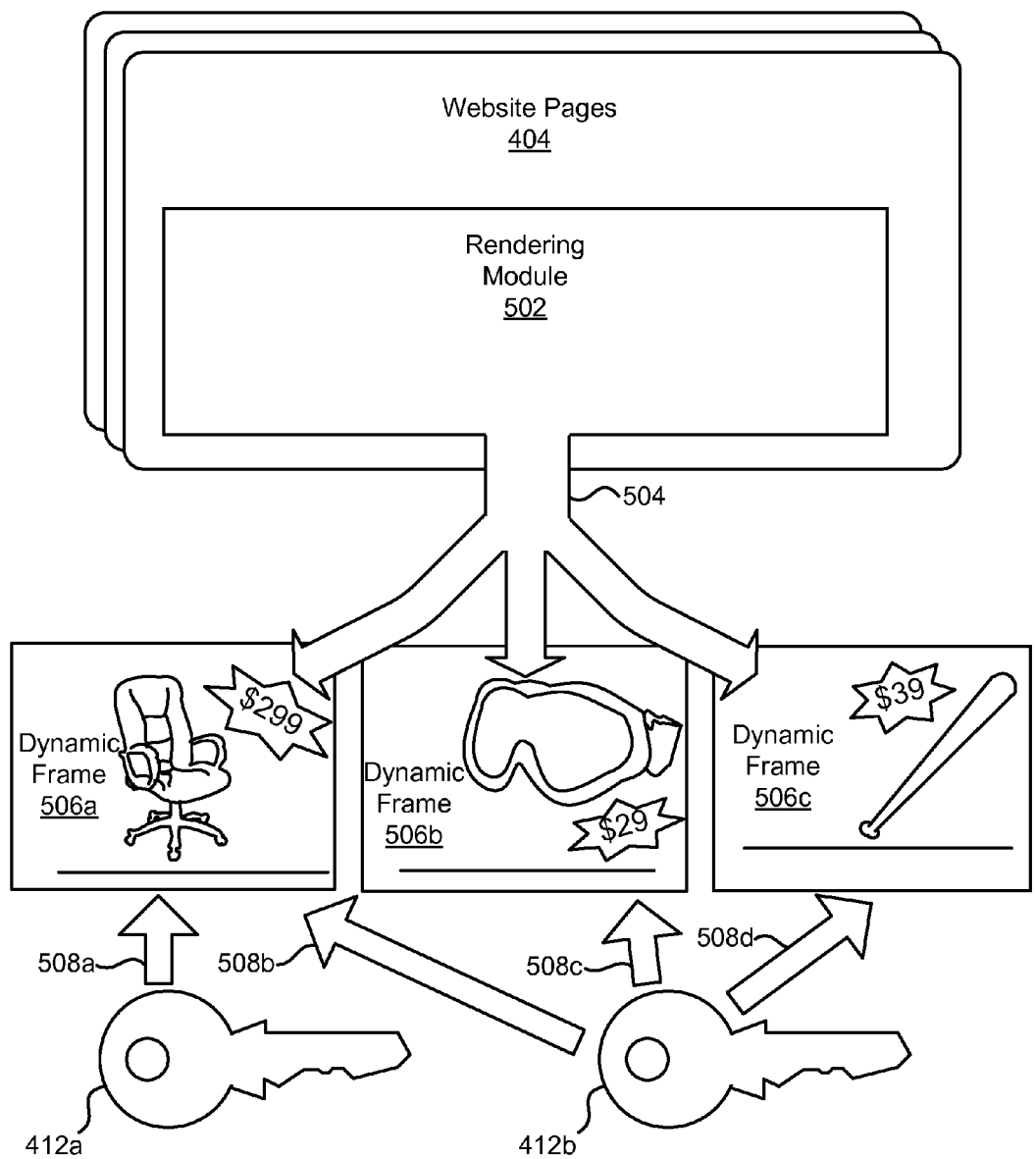
FIG. 5 shows one example of rendering standalone pages with content targeted for various potential visitors of the website.

Referring to FIG. 5, a rendering module 502 pertaining to a set of pages 404 of a website 214 is depicted, consistent with some, but not all embodiments. Embodiments consistent with FIG. 5 fill the variable portion 304 with one or more standalone pages 506a-c. However, visitor targeted content can be embedded in the variable portion 304 in alternative ways. For example, by way of illustration and not limitation, in alternative embodiments Javascript can call the server directly instead of by retargeting an frame. AJAX technologies are consistent with this alternative approach.

In embodiments that generate standalone pages 506a-c, however, the rendering module 502 can render 504 standalone pages 506a-c with variable, visitor targeted content, which can be related to e-commerce activities such as advertisements based on business and/or presentation logic for a server-side script engine, such as, without limitation, JAVA SERVER PAGES (JSP), ACTIVE SERVER PAGES (ASP), and PHP. Depending on the embodiment, the rendering 504 can take place on the website server 118, or on a cache server 210a-e. Once visitor targeted content has been rendered 504 as a standalone page 506a-c, the corresponding standalone page 506 is ready to be cached on a cache server 210a-e, reducing traffic, latency, and the load on any one particular server 118, 210a-e.

Each cache key 412a-b carries one or more result values that can be employed to access 508 one or more standalone pages 506a-c. In some cases, a single cache key 412a can contain one or more values that only access 508a a single standalone page 506a. In other cases, a single cache key 412b can contain values to access 508b-d multiple standalone pages 506a-c. In this way one standalone page 506a can be accessed 508a-b by multiple cache keys 412a-b pertaining to more than one visitor accessing the cacheable content 212. The ability for a standalone page 506a to be accessed 508a-b by multiple visitors is a great advantage over a situation where each standalone page 506 is cached by user identity, preventing sharing of such cache entries.

For example, a standalone page 506a, can be accessible by the cache keys 412a-b of multiple members of a common demographic, subset of a demographic, multiple demographics, or visitors to the cacheable content 212 who have purchased a certain common item or items on the website 214, or engaged in any other common tracked or timed activities. Other options for using cache keys 412a-b to access 508 standalone pages 506a-c will be apparent to those of ordinary skill in the art.

Figure 6:
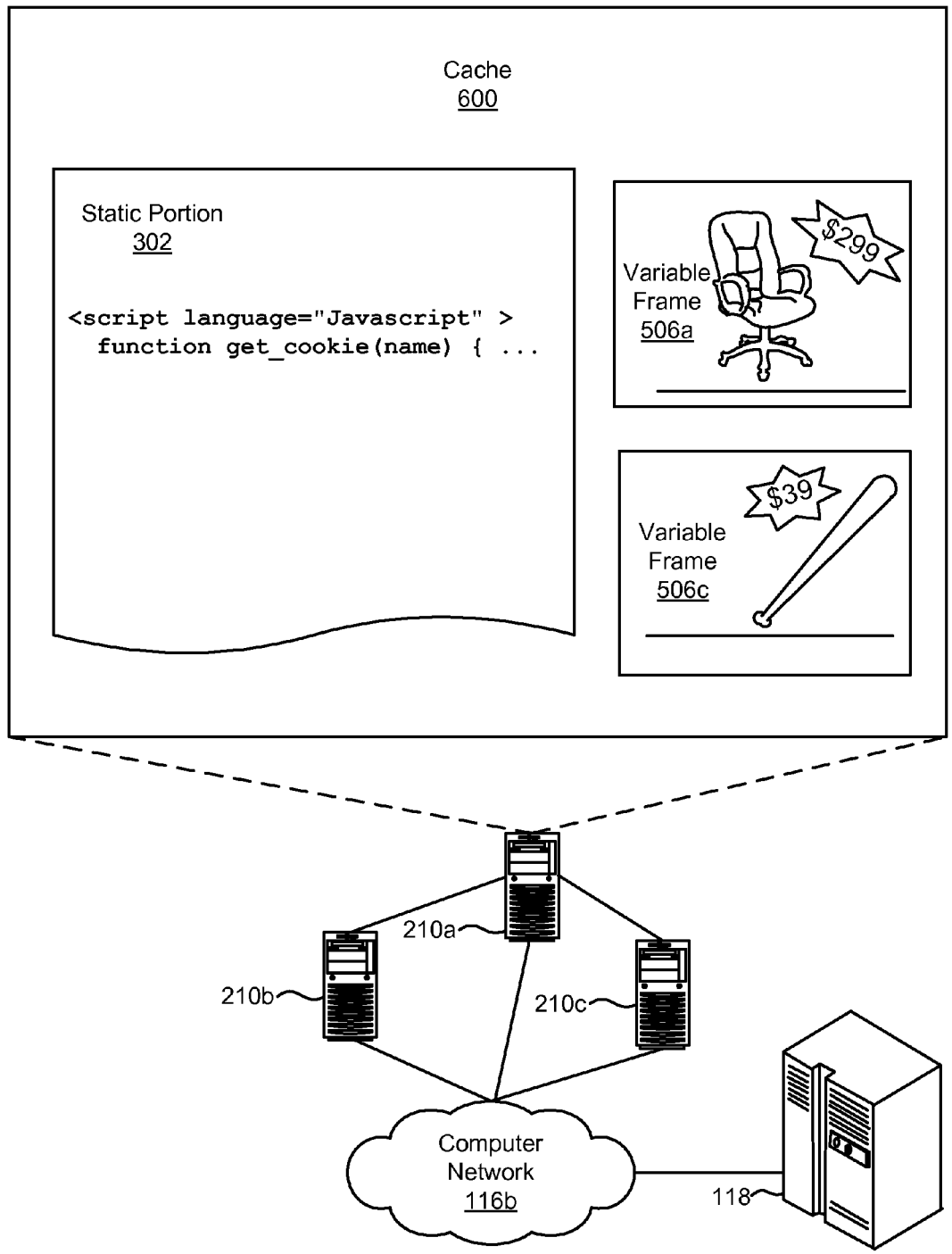
FIG. 6 shows one example of caching both a static portion of a webpage and variable standalone pages with variable content on a remote edge server.

Referring to FIG. 6, a cache 600 is depicted in which a static portion 302 of a cacheable content 212 is cached together with multiple standalone pages 506a, 506c. The multiple standalone pages 506a, 506c are cached on an edge server 210a disposed relatively close to the computing system 100 of the visitor 206 visiting the cacheable content 212. Other cache servers 210b-c situated closer to other potential visitors to the cacheable content 212 can also contain the static portion 302 of a cacheable content 212, together with multiple standalone pages 506a, 506c.

All such cache servers 210a-c are connected to a computer network 116b coupled to a website server 118. Therefore, by caching the static portion 302 of a cacheable content 212, together with multiple standalone pages 506a, 506c, the entire content 212, including relatively static and dynamic portions can be cached remotely from the website server 118. By caching variable, visitor targeted content as standalone pages 506a, 506c, there is no need to waste time and resources generating dynamic content. For such reasons, overall traffic, latency, and the load are greatly reduced.

Figure 7:
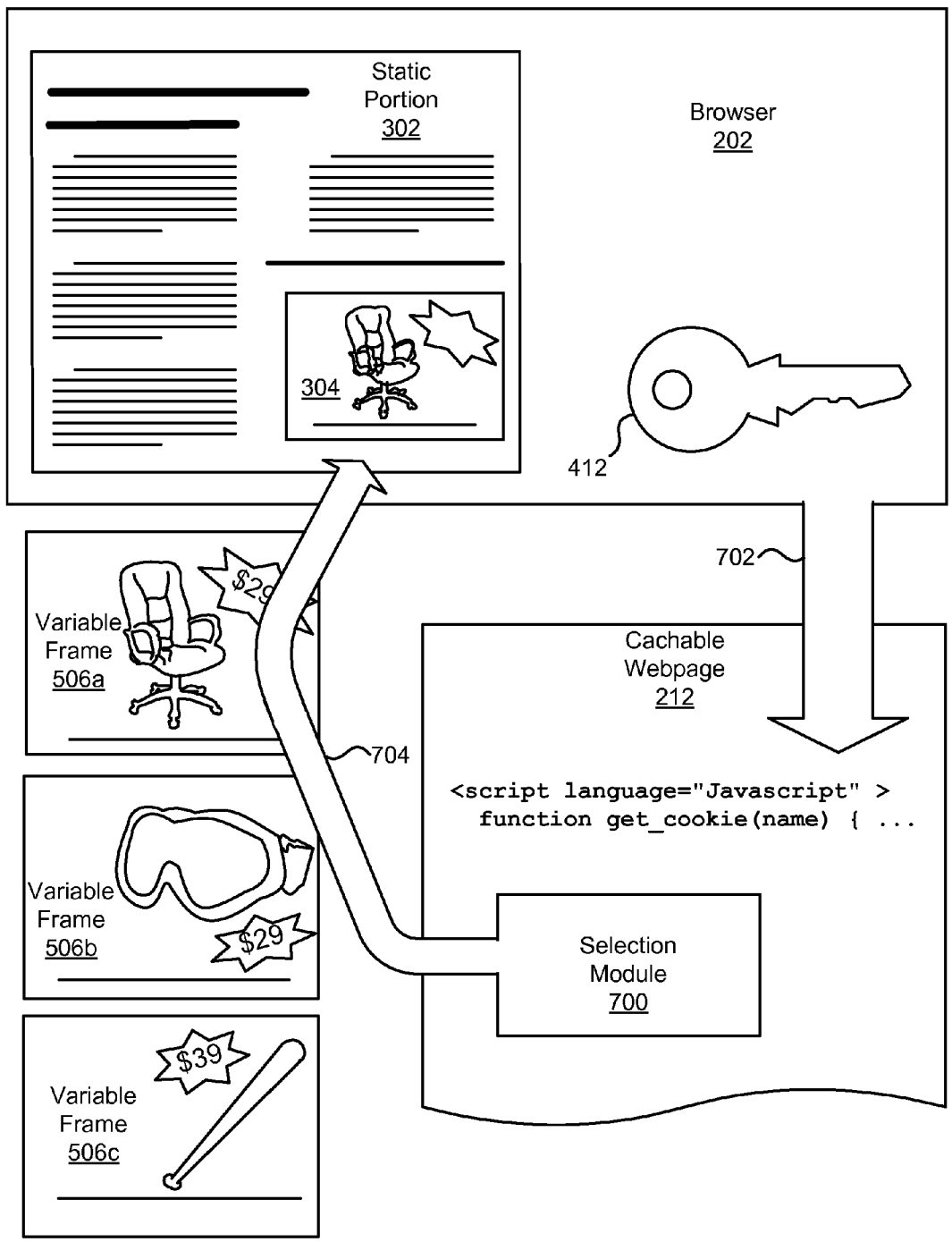
FIG. 7 shows one example of using embedded code in a webpage to select a standalone page tailored to a particular visitor to the website for display in a variable frame of the webpage based on a cache key.

Referring to FIG. 7, one embodiment of an environment of a selection module 700 is depicted. The selection module 700 resides within the embedded code 306 of the cacheable content 212, and can involve one or more functions within the embedded code 306. The embedded code 306 retrieves 702 a cache key 412 from a browser 202 associated with the visitor 206 accessing the cacheable content 212.

The selection module 700 then evaluates information provided by the cache key 412 to select 704 a standalone page 506a accessed by the embedded code 306 of the cacheable content 212. The cache key 412 contains information about the visitor 206 that can be used by the embedded code 306 of the cacheable content 212 to select 704 content, embedded in a standalone page 506a, that is dynamic and/or targeted to the visitor 206 accessing the cacheable content 212 for display in the dynamic frame 304.

For a given dynamic frame 304, one or more decision rules within the selection module 700 of the cacheable content 212 can specify which information or criteria to check the cache key 412 for to determine 704 which dynamic content to display in the dynamic frame 304. (Depending on the embodiment, the decision rules can take the place of the targeting rules discussed, or can simply access information). In certain embodiments, the selection module 700 appends result values from the cookies, or other information, 410 that make up the cache key 412 as parameters for a Uniform Resource Locator ("URL") for a Hyper-Text Transfer Protocol ("HTTP") request to load a standalone page 506a. The embedded code 306 can also be operable to select a default standalone page 506a in the event that the browser 202 does not contain a cache key 412 or does not possess a cache key 412 with sufficient information to select a standalone page 506.

In certain of such embodiments, a generic uniform resource locator is generated by the rendering module 502 to represent a collection of variant content. This collection of variant content can include one or more units of visitor targeted content. In such embodiments, the rendering module 502 can also generate a targeted uniform resource locator for a particular visitor targeted content in the collection of variant content. The targeted uniform resource locator can include the generic uniform resource locator and one or more result values.

The rendering module 502 can then render a standalone page configured to display at least a portion of the variable portion, i.e., visitor targeted content, of the website. To generate the standalone page, the rendering module 502 can use the cache key, including the generic uniform resource locator and one or more result values. A cache server 210a-e/website server 118 can then provision the standalone page to the browser 202.

Figure 8:
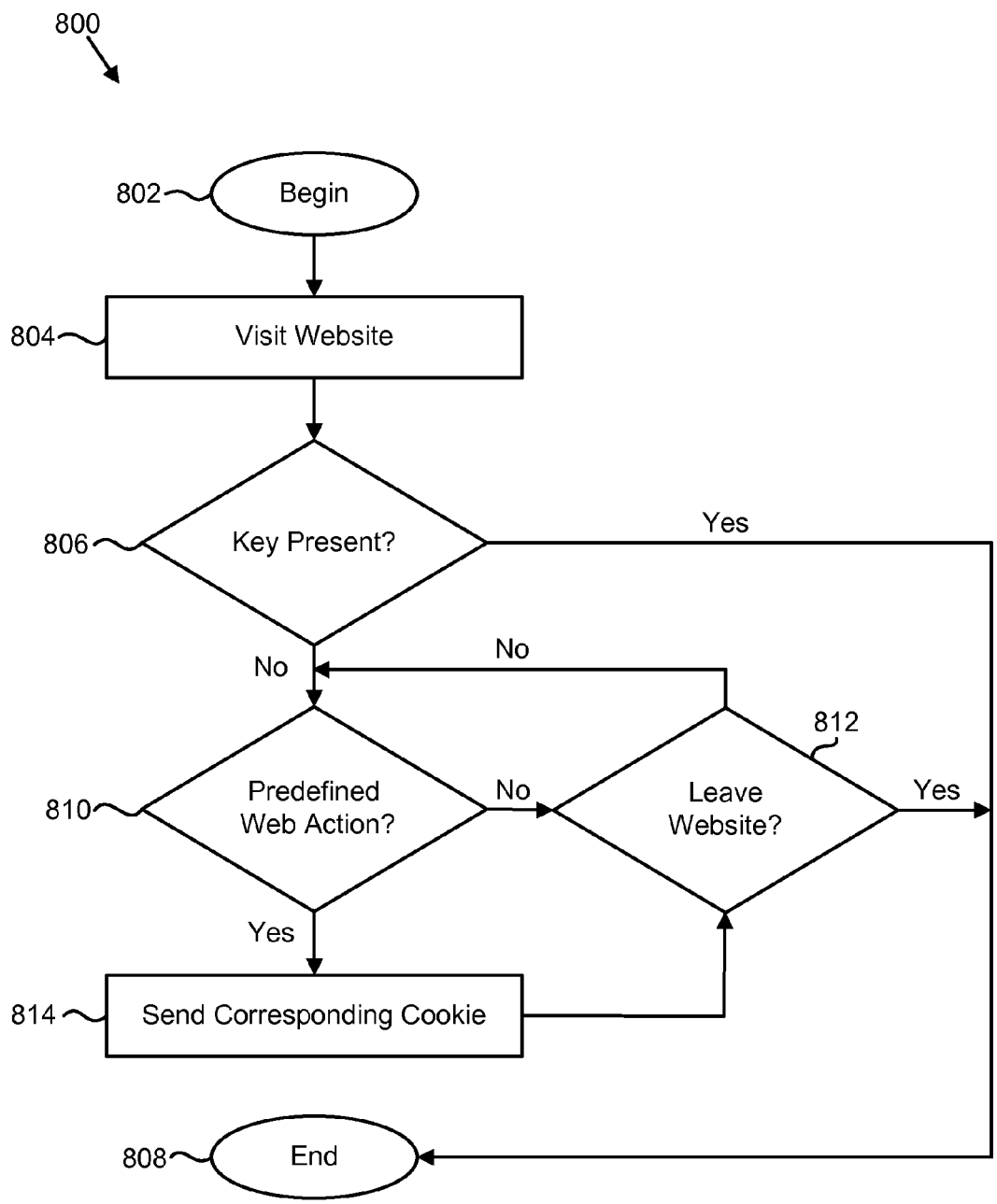
FIG. 8 shows one example of a method for provisioning cookies with information used to generate a cache key consistent with the present invention.

Referring to FIG. 8, a process 800 is depicted, consistent with an aspect of the present invention, for providing a browser 202 with information about a visitor's 206 activities on a website 214. The process 800 begins 802 when a visitor 206 visits 804 a set of pages 404 of a website 214. The set of pages 404 determine 806 whether the browser 202 already has a cache key 412. (In certain embodiments, the cache key 412 expires after a predetermined amount of time, or upon occurrence of a certain event or events. In another embodiment, the cache key 412 expires upon a return visit to the website 214.) If the browser 202 already contains a cache key 412, the method 800 ends 808. However, in an alternative embodiment, the method 800 can continue so that additional cookies, or other information, 412a-c are sent to the browser 202 to be added to the cache key 412, as discussed below.

If the browser 202 does not already contain a cache key 412, the method 800 continues by determining 810 if the visitor 206 is engaging in a predefined web action. If the answer is no, the determination process 810 continues until the visitor 206 leaves 812 the set of pages 404 of the website 214, in which case the method 800 ends 808. If the visitor 206 does not leave 812, the method 800 continues until a predefined web action is detected 810. In certain embodiments, this determination 810 can be accomplished by one or more event listener(s).

If the method 800 detects 810 a predefined web action, the method 800 sends 814 one or more cookies with information about the predefined web action, which can simply indicate the web action, indicate the web action and its duration and/or time, and or provide a result value based on targeting rules discussed above. Such web actions can include, without limitation, accessing individual webpages within a website, accessing groups of pages, downloading content, mouse clicks within predefined fields, checking boxes, selecting buttons, filling out forms, making inquiries and requests, and scrolling. As discussed, such web actions can also include engaging in transactions such as purchases. In certain embodiments, the corresponding cookie(s) 410 can also provide information about the amount of time spent engaged in the activity. If the visitor 206 leaves 812 the set of pages 404 of the website 214, after engaging in a web action on the set of pages 404, the method 800 ends 808. Otherwise, the method 800 continues by determining 810 if the user 206 engages in a predefined web action.

Figure 9:
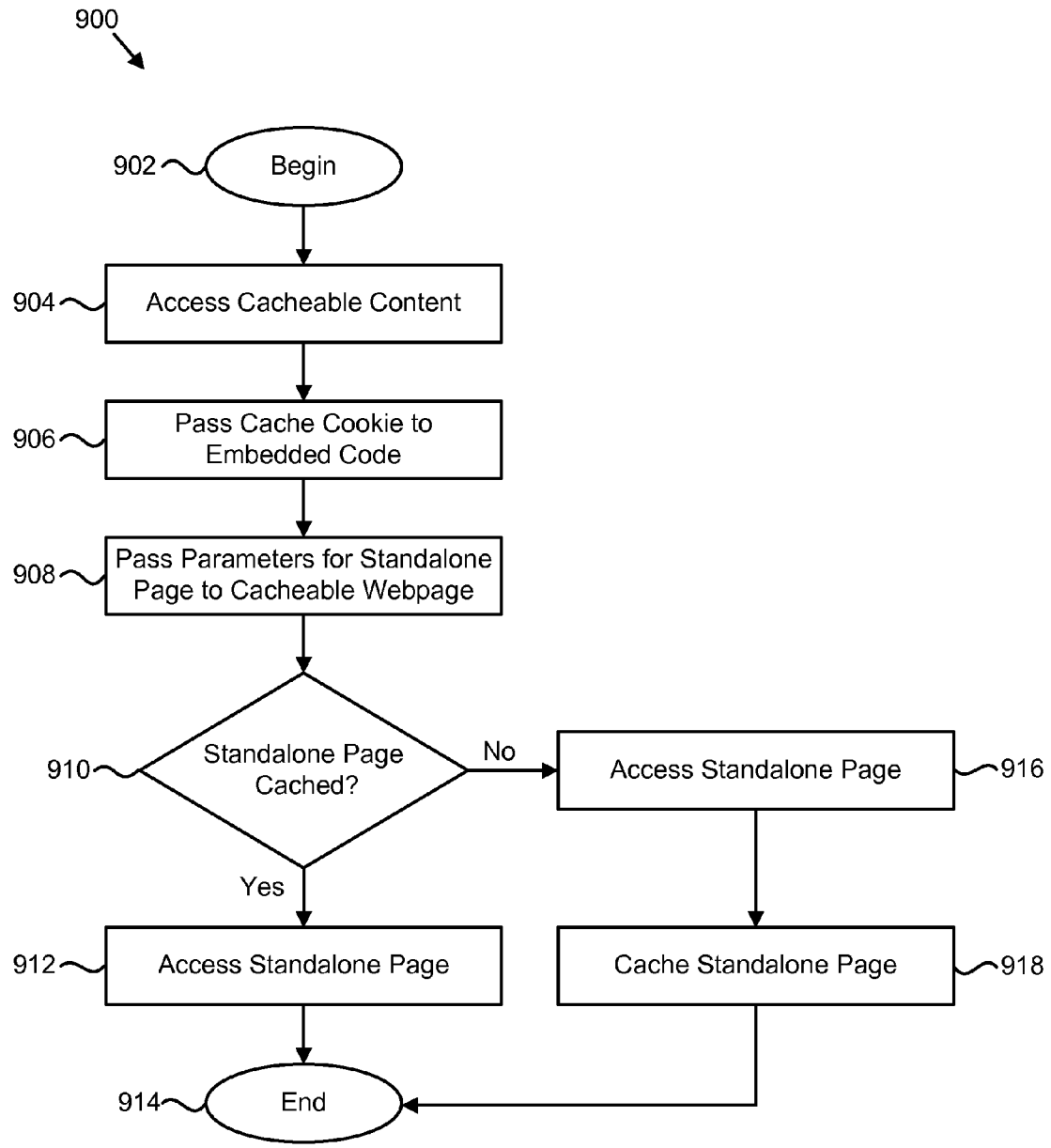
FIG. 9 shows one example of a method for determining when to cache a standalone page with variable content on an edge server.

Referring to FIG. 9, a process 900 is depicted, consistent with an aspect of the present invention, for determining whether to cache a standalone page 506*a-c* with a cacheable content 212 on a cache server 210*a-e*. The process 900 begins 902 when a browser 202 visits 904 a cacheable content 212. The browser 202 provides 906 a cache key 412 to embedded code 306 of the cacheable content 212. The embedded code 306 passes 908 one or more parameters for a separate HTTP request corresponding to a particular standalone page 506*a*, which can be stored at a website server 118 or a cache server 210*a-e*.

The method 900 continues by determining 910 whether the standalone page 506*a* is cached on a cache server 210*a-e*. If the answer is yes, the browser 202 accesses 912 the standalone page 506*a* from a cache server 210 caching the standalone page 506*a*, which can be the cache server 210*a* nearest the computing system 100 of the visitor 206 accessing the cacheable content 214, and the method 900 ends 914. If the answer is no, the browser 202 accesses 916 the standalone page 506*a* from the website server 118, where it is rendered. Once a standalone page 506 is rendered, its header can be set to indicate that the standalone page 506 is cacheable.

The method 900 continues by caching 918 the standalone page 506*a* on a cache server 210*a-e*. In certain embodiments, the caching 918 step involves caching 918 the standalone page 506*a* on the cache/edge server 210*a* nearest the computing system 100 of the visitor 206 accessing the cacheable content 212. After caching 918 the standalone page 506*a*, the method 900 ends.

The block diagrams in the Figures illustrate the architecture, functionality, and operation of possible implementations of systems, methods, and computer-usable storage media according to various embodiments of the present invention. In this regard, each block in the block diagrams can represent a module, segment, or portion of code, which comprises one or more executable instructions for implementing the specified logical function(s). It should also be noted that, in some alternative implementations, the functions discussed in association with a block can occur in a different order than discussed. For example, two functions occurring in succession can, in fact, be implemented in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

The invention claimed is:

1. A computer program product for caching variable webpage content, the computer program product comprising:
a non-transitory computer-readable storage medium having computer-usable program code embodied therein, the computer-usable program code comprising:
computer-usable program code to divide webpage content pertaining to a website into a static portion and a variable portion, the variable portion configured to display visitor targeted content tailored to a particular visitor to the website;
computer-usable program code to pre-evaluate information about the particular visitor according to at least one targeting rule to produce at least one result value;
computer-usable program code to provision the at least one result value to a browser of the particular visitor for storage, wherein the at least one result value is included within a cache key maintained by the browser;
computer-usable program code to evaluate the cache key to determine which visitor targeted content, residing on a cache server proximate the browser that executes on a different machine than the browser, to display in the variable portion, the cache server caching visitor targeted content from a website server located geographically further from the browser than the cache server; and
computer-usable program code to retrieve the determined visitor targeted content from the cache server for display in the variable portion of the webpage, wherein retrieving the determined visitor targeted content comprises generating a targeted uniform resource locator comprising a result value from the at least one result value, and using the targeted uniform resource locator to retrieve, from the cache server, a standalone page for display in the variable portion.

2. The computer program product of claim 1, wherein at least a portion of the visitor targeted content is configured to be embedded in the variable portion by at least one asynchronous call to the cache server.

3. The computer program product of claim 2, wherein the targeted uniform resource locator includes a generic uniform resource locator that represents a collection of variant content that includes the visitor targeted content.

4. The computer program product of claim 2, further comprising computer-usable program code to configure a header for a particular visitor targeted content from the visitor targeted content indicating that the particular visitor targeted content with the header is cacheable.

5. The computer program product of claim 4, further comprising:
computer-usable program code to determine that a particular visitor targeted content from the visitor targeted content has previously been cached on the cache server; and
computer-usable program code to indicate that the particular visitor targeted content can be accessed from the cache server for loading into the variable portion.

6. The computer program product of claim 1, wherein the cache key also includes information unrelated to the at least one result value.

7. The computer program product of claim 1, wherein a particular visitor targeted content of the visitor targeted content is configured to expire after a predetermined amount of time.

8. The computer program product of claim 1, further comprising computer-usable program code to provision to the browser at least one result value configured to update the cache key upon a subsequent visit to the website by the browser.

9. An apparatus for caching variable webpage content, the apparatus comprising:
- at least one processor;
- at least one memory device coupled to the at least one processor and storing computer instructions for execution on the at least one processor, the computer instructions enabling the at least one processor to:
  - divide webpage content pertaining to a website into a static portion and a variable portion, the variable portion configured to display visitor targeted content tailored to a particular visitor to the website;
  - pre-evaluate information about the particular visitor according to at least one targeting rule to produce at least one result value;
  - provision the at least one result value to a browser of the particular visitor for storage, wherein the at least one result value is included within a cache key maintained by the browser;
  - evaluate the cache key to determine which visitor targeted content, residing on a cache server proximate the browser that executes on a different machine than the browser, to display in the variable portion, the cache server caching visitor targeted content from a website server located geographically further from the browser than the cache server; and
  - retrieve the determined visitor targeted content from the cache server for display in the variable portion of the webpage, wherein retrieving the determined visitor targeted content comprises generating a targeted uniform resource locator comprising a result value from the at least one result value, and using the targeted uniform resource locator to retrieve, from the cache server, a standalone page for display in the variable portion.

10. The apparatus of claim 9, wherein the targeted uniform resource locator includes a generic uniform resource locator that represents a collection of variant content that includes the visitor targeted content.

11. The apparatus of claim 10, wherein the computer instructions further enable the at least one processor to configure a header for a particular visitor targeted content from the visitor targeted content indicating that the particular visitor targeted content with the header is cacheable.

12. The apparatus of claim 10, wherein a particular visitor targeted content of the visitor targeted content is configured to expire after a predetermined amount of time.

* * * * *